US010142545B2

(12) United States Patent
Abe

(10) Patent No.: US 10,142,545 B2
(45) Date of Patent: Nov. 27, 2018

(54) IMAGE STABILIZING APPARATUS, ITS CONTROL METHOD, IMAGE PICKUP APPARATUS, AND STORAGE MEDIUM

(71) Applicant: CANON KABUSHIKI KAISHA, Tokyo (JP)

(72) Inventor: Tomonari Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/450,592

(22) Filed: Mar. 6, 2017

(65) Prior Publication Data

US 2017/0257573 A1 Sep. 7, 2017

(30) Foreign Application Priority Data

Mar. 7, 2016 (JP) ................................ 2016-043368

(51) Int. Cl.

*H04N 5/232* (2006.01)
*G06T 7/215* (2017.01)
*G06T 7/62* (2017.01)
*G06T 7/90* (2017.01)
*G06T 7/70* (2017.01)

(Continued)

(52) U.S. Cl.

CPC ......... *H04N 5/23267* (2013.01); *G06T 7/215* (2017.01); *G06T 7/248* (2017.01); *G06T 7/62* (2017.01); *G06T 7/70* (2017.01); *G06T 7/97* (2017.01); *H04N 5/23254* (2013.01); *H04N 5/23261* (2013.01); *G06T 2207/10004* (2013.01); *G06T 2207/20201* (2013.01)

(58) Field of Classification Search

CPC ........... H04N 5/23267; H04N 5/23261; H04N 5/23254; G06T 7/62; G06T 7/97; G06T 7/215; G06T 7/70; G06T 2207/20201; G06T 2207/10004

See application file for complete search history.

(56) References Cited

U.S. PATENT DOCUMENTS

2008/0252717 A1* 10/2008 Moon ................ H04N 5/23238 348/36
2010/0271494 A1* 10/2010 Miyasako .......... G06K 9/00261 348/208.1

(Continued)

FOREIGN PATENT DOCUMENTS

JP 08-088855 A 4/1996
JP 2006-317848 A 11/2006

*Primary Examiner* — Jason A Flohre

(74) *Attorney, Agent, or Firm* — Cowan, Liebowitz & Latman, P.C.

(57) ABSTRACT

An image stabilizing apparatus includes one or more processors, and a memory storing instructions which, when executed by the one or more processors, cause the image stabilizing apparatus to function as a detecting unit configured to detect a motion vector in a plurality of areas made by dividing motion vector detecting frames set in a plurality of images sequentially output from an imaging unit, and a control unit configured to determine a motion vector of an object in the detected motion vector and to perform an image stabilization control based on the motion vector of the object. The control unit determines a size of the object based on the motion vector of the object, and changes the motion vector detecting frame based on the size of the object and a position of the object.

11 Claims, 13 Drawing Sheets

(51) Int. Cl.
*G06T 7/00* (2017.01)
*G06T 7/246* (2017.01)

(56) References Cited

U.S. PATENT DOCUMENTS

| | | | | |
|---|---|---|---|---|
| 2010/0290672 | A1* | 11/2010 | Nishino | G01P 13/00 382/103 |
| 2015/0003676 | A1* | 1/2015 | Kuchiki | G06T 7/2053 382/103 |
| 2017/0134649 | A1* | 5/2017 | Wakamatsu | H04N 5/23229 |

* cited by examiner

IMAGE STABILIZING APPARATUS, ITS CONTROL METHOD, IMAGE PICKUP APPARATUS, AND STORAGE MEDIUM

BACKGROUND OF THE INVENTION

Field of the Invention

The present invention relates generally to an image stabilizing apparatus, and more particularly to an image stabilizing apparatus configured to assist follow shot imaging.

Description of the Related Art

The follow shot imaging technology expresses a speed sense of a moving object. The follow shot makes the moving object stationary and the background flow when a photographer pans the camera in accordance with the motion of the object.

The photographer needs to pan the camera in accordance with the motion of the object in the follow shot imaging. However, the object image blurs when the panning velocity is too fast or too slow and there is a difference between the moving velocity of the object and the panning velocity. The follow shot imaging assist technology is one solution for this problem for a user, which provides a method for absorbing the difference between the moving velocity of the object and the panning velocity using a movement of the shift lens.

Japanese Patent Laid-Open No. ("JP") 2006-317848 discloses a configuration that provides the follow shot imaging by detecting an object based on a blur detection through a gyro sensor and a motion vector in an image, by calculating a correction amount used to dispose the detected object at the center of the image, and by moving an optical axis shift lens for corrections.

As the technology of detecting the motion vector in the image, a method for detecting the motion vector is proposed by comparing continuously captured images with one another. JP 8-88855 proposes a method for comparing pixel values of a reference block and a candidate block as block matching objects used to detect a motion vector in a search area by shifting a position of the candidate block.

However, according to the prior art disclosed in JP 2006-317848 and JP 8-88855, when an object is smaller than a predetermined size, only a small number of reference blocks are used to detect the motion vector and the reliability of the motion vector to the object becomes lower. When an image stabilizing apparatus assists the follow shot imaging, the correction precision of the object blur may lower and the object blur may not be reduced.

SUMMARY OF THE INVENTION

The present invention provides an image stabilizing apparatus, its control method, an image pickup apparatus, and a storage medium, each of which is advantageous to the image stabilization of an object, even when the object is smaller than a predetermined size.

An image stabilizing apparatus according to one aspect of the present invention includes one or more processors, and a memory storing instructions which, when executed by the one or more processors, cause the image stabilizing apparatus to function as a detecting unit configured to detect a motion vector in a plurality of areas made by dividing motion vector detecting frames set in a plurality of images sequentially output from an imaging unit, and a control unit configured to determine a motion vector of an object in the detected motion vector and to perform an image stabilization control based on the motion vector of the object. The control unit determines a size of the object based on the motion vector of the object, and changes the motion vector detecting frame based on the size of the object and a position of the object.

Further features of the present invention will become apparent from the following description of exemplary embodiments with reference to the attached drawings.

DESCRIPTION OF THE EMBODIMENTS

A description will now be given of embodiments according to the present invention with reference to the accompanying drawings.

Figure 1:
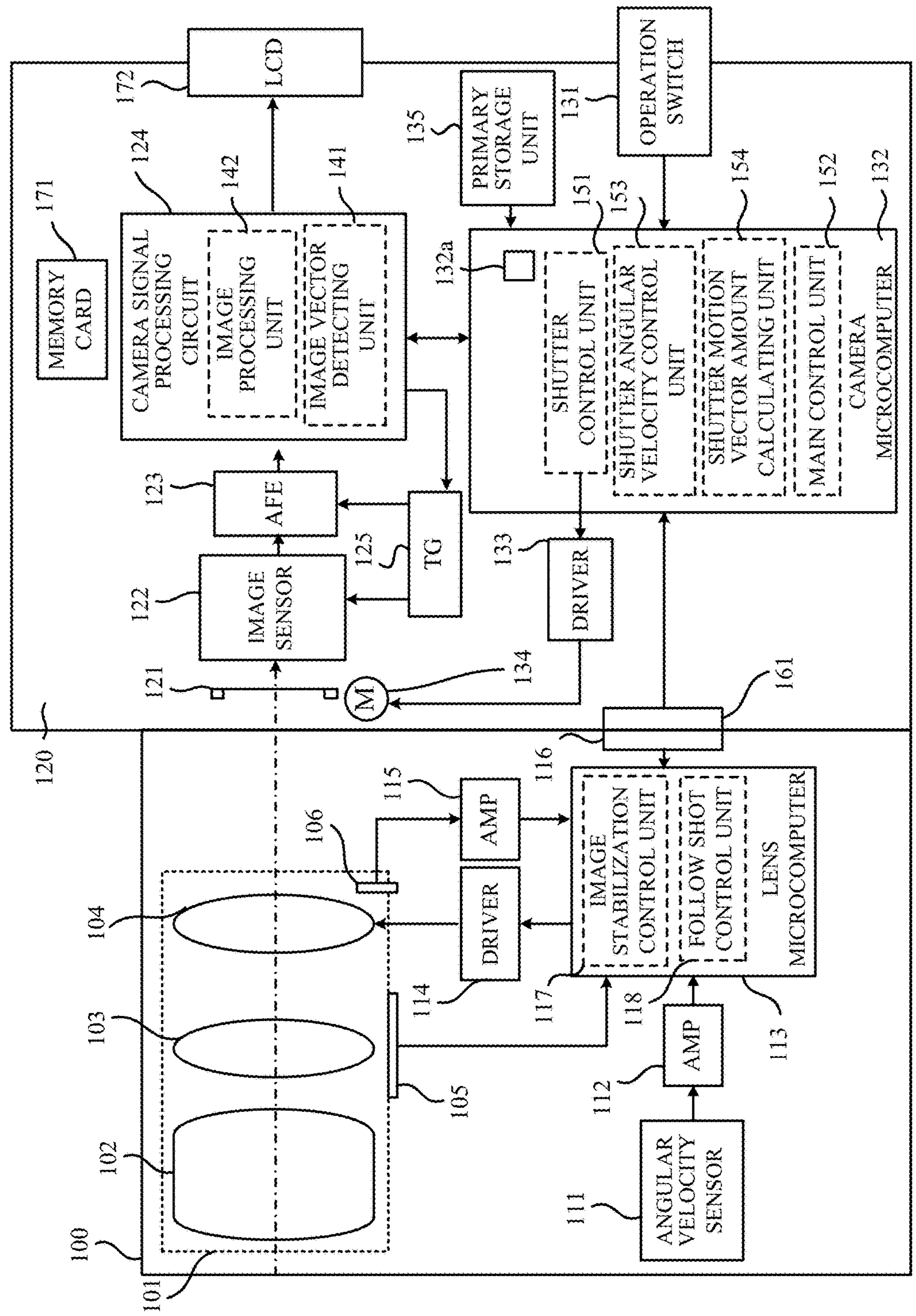
FIG. 1 is a block configuration diagram of an image pickup apparatus common to a variety of embodiments according to the present invention.

FIG. 1 is a configuration view of an image pickup apparatus (imaging system) according to one embodiment of the present invention.

The image pickup apparatus according to this embodiment includes a camera body and an interchangeable lens (image pickup lens) detachably attached to the camera body. However, the present invention is not limited to this embodiment, and is applicable to a lens integrated image pickup apparatus in which the image pickup lens is integrated with the camera body.

In FIG. 1, reference numeral 100 denotes an interchangeable lens, and reference numeral 120 denotes a camera body.

The interchangeable lens 100 includes an image pickup lens unit 101 (optical system). The image pickup lens unit 101 includes a main imaging optical system 102, a zoom lens unit 103 configured to change a focal length, and a shift lens unit 104 configured to optically correct an image blur to an optical axis caused by a vibration of the image pickup apparatus by moving in a direction orthogonal to the optical axis. Herein, the zoom lens unit 103 and the shift lens unit 104 will be referred to as a zoom lens and a shift lens.

The interchangeable lens 100 further includes a detecting system, such as a zoom encoder 105 configured to detect the position of the zoom lens, a position sensor 106 configured to detect the position of the shift lens, and an angular velocity sensor (vibration detecting unit) 111 configured to detect the vibration of the image pickup apparatus. The interchangeable lens 100 further includes a drive system, such as a driver 114 configured to drive the shift lens. The interchangeable lens 100 further includes a lens system controlling microcomputer (referred to as a "lens microcomputer" hereinafter) 113 as a control system configured to control the entire lens system. The interchangeable lens 100 further includes an amplifier 112 configured to amplify an output of the angular velocity sensor 111, an amplifier 115 configured to amplify an output of the position sensor 106 for the shift lens, and a mount contact unit 116 with the camera body 120.

The lens microcomputer 113 includes an image stabilization control unit 117 configured to provide an image stabilization, and a follow shot control unit 118 configured to provide a follow shot assist control.

While the lens microcomputer 113 includes the image stabilization control unit 117 and the follow shot control unit 118 in this embodiment, the present invention is not limited to this embodiment and the image stabilization control unit 117 and the follow shot control unit 118 may be provided in the camera body 120 (camera microcomputer). While this embodiment provides the angular velocity sensor 111 and the amplifier 112 to the interchangeable lens 100, the present invention is not limited to this embodiment and the camera body 120 includes these components.

The lens microcomputer 113 performs a focus lens control and a diaphragm control, but these controls are omitted for simple illustration purposes.

The image stabilization detects and corrects the vibrations in two orthogonal directions, such as a longitudinal direction and a lateral direction, but the image stabilization in each direction uses the same configuration. Therefore, the configuration only in one axis will be discussed later.

On the other hand, the camera body 120 includes an imaging system that includes a shutter 121, and an image sensor 122, such as a CMOS sensor. The camera body 120 further includes a drive system that includes a shutter driving motor 134 for a shutter operation, and a driver 133 configured to drive the motor 134. The camera body 120 further includes a signal processing system, such as an analog signal processing circuit ("AFE") 123 and a camera signal processing circuit 124. The camera body 120 further includes a camera system controlling microcomputer (referred to as a "camera microcomputer" hereinafter) 132 as a control system configured to control the entire camera system. The camera body 120 further includes a camera operation switch 131 (operation system) such as a power switch, a release switch, and a switch used to set a follow shot assisting mode. The camera body 120 further includes a timing generator 125 configured to set an operational timing for the image sensor 122 and the analog signal processing circuit 123, and a primary storage unit 135. The primary storage unit 135 is a volatile unit, such as a RAM, configured to store temporary data and used for a working area for the camera microcomputer 132.

The camera body 120 further includes a memory card 171 configured to store a captured image, a liquid crystal panel (referred to as an "LCD" hereinafter) 172 configured to monitor the image to be captured by the camera and display the captured image, and a mount contact unit 116 with the interchangeable lens 100. The lens microcomputer 113 and the camera microcomputer 132 perform a serial communication with each other via the mount contact units 116 and 161 at a predetermined timing.

The camera signal processing circuit 124 includes a motion vector detecting unit 141 and an image processing unit 142. The motion vector detecting unit 141 calculates a motion vector amount of a vector detecting frame based on a captured image. More specifically, the motion vector detecting unit 141 sets a motion vector detecting frame (referred to as a "template frame" hereinafter) in a plurality of images sequentially output from the image sensor 122, and detects a motion vector based on a plurality of areas (referred to as "vector detecting frames" hereinafter) made by dividing the motion vector detecting frame.

The camera microcomputer (control unit) 132 includes a shutter control unit 151 configured to control a shutter, an object angular velocity calculating unit 153 configured to calculate the angular velocity of the object, and an object motion vector amount calculating unit 154 configured to detect the motion vector amount of the object. The camera microcomputer 132 further includes an acquiring unit 132*a* configured to acquire a signal output from the lens microcomputer 113, a signal output from the camera signal processing circuit 124, a signal output from the operation switch 131, etc. While this embodiment includes the motion vector detecting unit 141 separately from the camera microcomputer 132, the motion vector detecting unit 141 may be integrated with the camera microcomputer 132.

The camera microcomputer 132 includes a main control unit 152 that controls the acquiring unit 132*a*, the shutter control unit 151, the object angular calculating unit 153, and the object motion vector amount calculating unit 154.

The camera microcomputer 132 controls the entire camera, communicates with the interchangeable lens 100, and performs an image stabilization control. More specifically, the camera microcomputer 132 determines a motion vector of the object and a motion vector of the background among the motion vector detected by the motion vector detecting unit 141, and performs the image stabilization control based on the motion vector of the object. In particular, this embodiment performs the image stabilization control to follow the object based on the motion vector of the object and the output from the angular velocity sensor 111 configured to detect the vibration.

In FIG. 1, when the camera is powered on by the operation switch 131, the camera microcomputer 132 detects the state change and controls the power supply to each circuit and its initialization in the camera body 120. The power is supplied to the interchangeable lens 100, and the components in the interchangeable lens 100 are initialized under control of the lens microcomputer 113. The lens microcomputer 113 and the camera microcomputer 132 start communications with each other at a predetermined timing. In this communication, the state of the camera, image pickup settings, etc. are sent from the camera to the lens, and the focal length information of the lens, the angular velocity information, etc. are sent from the lens to the camera.

In the normal mode in which the follow shot assisting mode is not performed, the angular velocity sensor 111 detects the vibration of the camera caused by the manual vibration etc. in the interchangeable lens. The image stabilization control unit 117 drives the shift lens 104 for the image stabilization using the detection result.

This embodiment moves the image stabilization lens (shift lens) 104 on a plane perpendicular to the optical axis for the optical image stabilization as one type of image stabilization. However, the image stabilization is not limited to the optical image stabilization and the image stabilization may move the image sensor on a plane perpendicular to the optical axis. This embodiment may also provide an electronic image stabilization configured to reduce the influence of the vibration by changing a cut position out of each imaging frame output from the image sensor. A combination these methods may be used for the correction. In other words, the optical element driven for the image stabilization may be one or both of the image stabilization lens and the image sensor.

First Embodiment

A description will now be given of the problems of the prior art once again. As described above, when the object is smaller than the predetermined size, only a small number of reference blocks can be used to detect the motion vector amount and thus the motion vector to the object is less reliable.

Figure 10A:
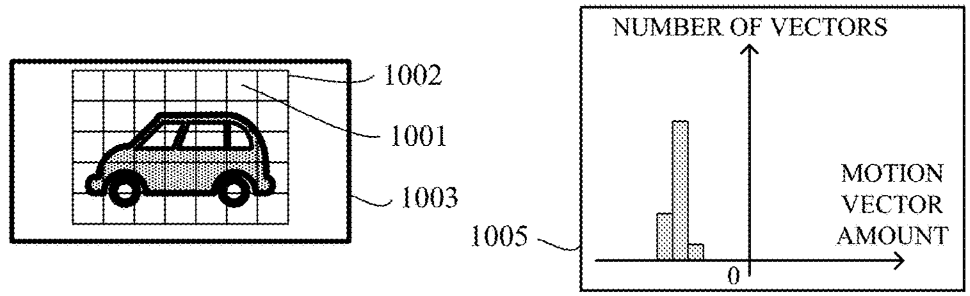
FIGS. 10A, and 10B illustrate a difference of a histogram between a large object and a small object.
Figure 10B:
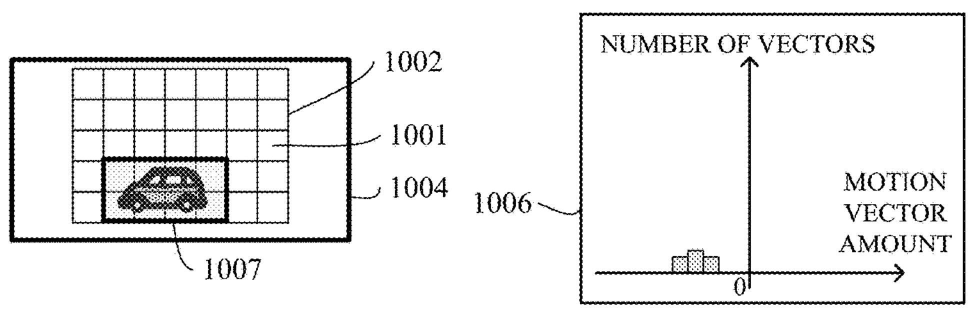

For example, a situation illustrated in FIG. 10 will be considered. FIG. 10A illustrates a large object larger than the predetermined size on the image plane. FIG. 10B illustrates a small object smaller than the predetermined size on the image plane. Herein, a reference block used to detect the motion vector amount will be defined as a "vector detecting frame" and a vector detecting frame set will be defined as a "template frame." Each of reference numerals 1003 and 1004 illustrates that a template frame 1002 having 7×5 vector detecting frames 1001 is disposed on the entire image plane. Reference numeral 1005 is an illustrative histogram of a detection result of the motion vector amounts in the reference numeral 1003, and reference numeral 1006 denotes an illustrative histogram of a detection result of the motion vector amounts in the reference numeral 1004. The abscissa axis denotes a motion vector amount, and the ordinate axis denotes the number of equal motion vectors (referred to as "the number of vectors" hereinafter). Each of the reference numerals 1005 and 1006 omits the background motion vector amounts and illustrate only the object motion vector amounts for simple illustration purposes.

As illustrated in the reference numeral 1005, more vector detecting frames are assigned to the object. Thus, as more vectors of the object can be acquired, the motion vector amount of the object becomes highly reliable.

On the other hand, reference numeral 1007 illustrated by a thick frame in FIG. 10B is a vector detecting frame used to detect the motion vector amount. Since the object on the image plane is small, more vectors of the object cannot be acquired. Thus, the motion vector amount of the object becomes less reliable.

Accordingly, it is conceivable to simply increase the number of vector detecting frames. For example, it is conceivable to convert the 7×5 vector detecting frames in the reference numeral 1004 into 14×10 vector detecting frames etc. so as to increase the number of vector detecting frames and to acquire more object vectors.

Figure 11:
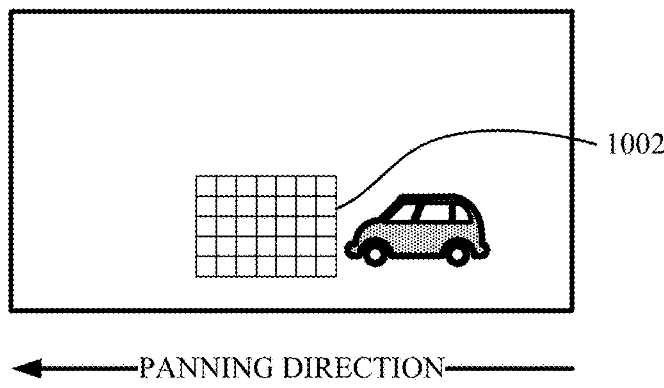
FIG. 11 illustrates a reduced template frame and a panned small object.

The motion vector amount calculating process needs a long time as the number of vector detecting frames increases. Accordingly, it is conceivable to reduce the template frame. Nevertheless, in the follow shot imaging, it is conceivable that the photographer pans the camera in accordance with the motion of the object and, for example, as the template frame is reduced as illustrated in FIG. 11, the object may be located outside the template frame.

Accordingly, the first embodiment of the present invention changes the template frame so as to accommodate the object in the template frame, and improves the reliability of the motion vector of the object and the correction precision of the object blur.

Follow Shot Assisting Process

Figure 2:
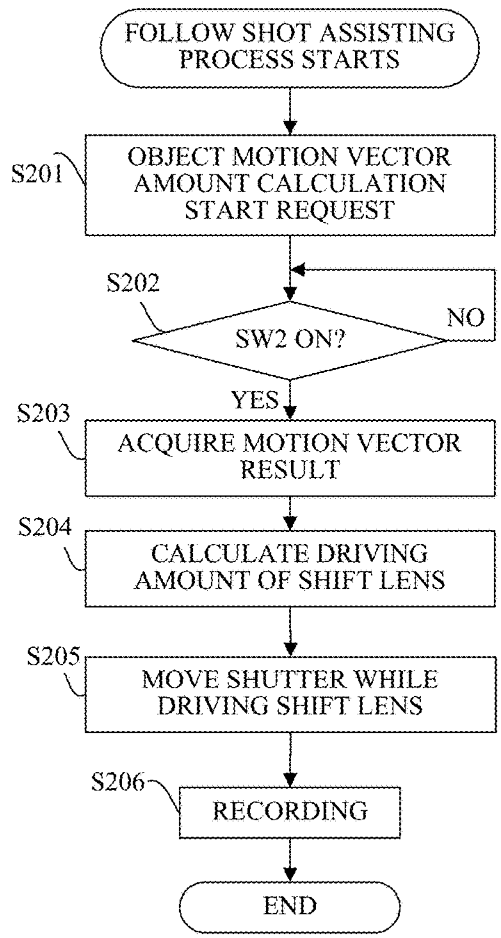
FIG. 2 is a flowchart of a follow shot assisting process according to a first embodiment.

Referring now to a flowchart illustrated in FIG. 2, a description will be given of a process made by the main control unit 152 in the follow shot assisting process. This process starts, for example, when the photographer sets the follow shot assisting mode, starts the live-view, and half-presses the release switch in the camera operation switch 131.

In the step S201, the main control unit 152 sends a calculation start request to the object motion vector amount calculating unit 154, which will be described later. The object motion vector amount calculating unit 154 starts calculating the object motion vector amount when receiving the calculation start request.

In the step S202, the main control unit 152 detects whether the release switch has been fully pressed. When the release switch is fully pressed in the step S202, the flow moves to the step S203 so as to acquire the object motion vector amount. When the release switch is not fully pressed in the step S202, the flow returns to the step S202 and this procedure is repeated until the release switch is fully pressed.

In the step S203, the main control unit 152 sends an acquisition request of the object motion vector amount to the object motion vector amount calculating unit 154. The object motion vector amount calculating unit 154 sends, when receiving the acquisition request of the object motion vector amount, the latest motion vector amount of the object as the motion vector result to the main control unit 152.

In the step S204, the main control unit 152 requests the object angular velocity calculating unit 153 to calculate the angular velocity of the object, when the main control unit 152 receives the motion vector result from the object motion vector amount calculating unit 154.

The object angular velocity calculating unit 153 calculates a driving amount of the shift lens for a correction that makes the motion vector amount zero.

Figure 9:
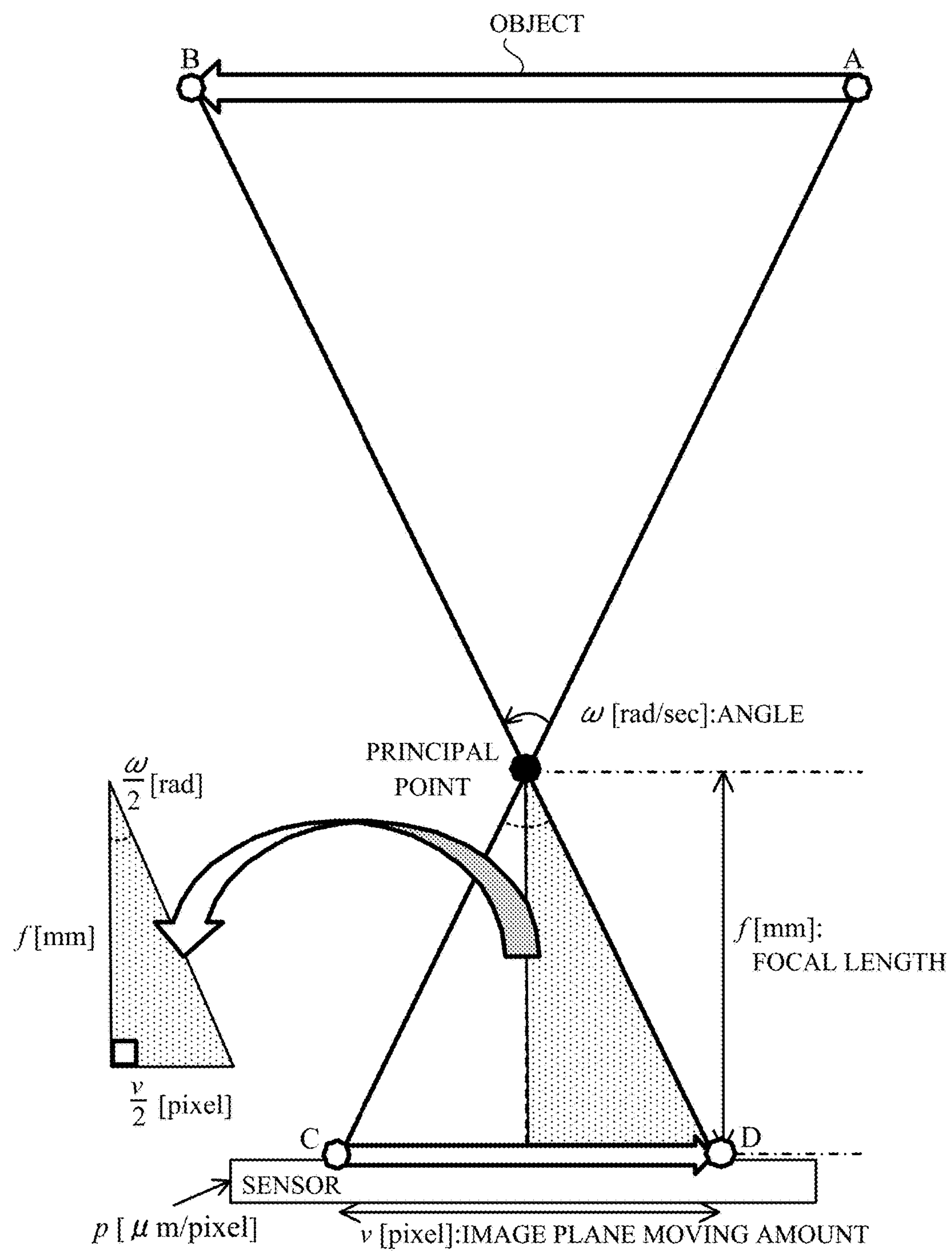
FIG. 9 illustrates a calculation method of an angular velocity of the object.

Referring now to FIG. 9, a description will be given of a calculating method of the angular velocity of the object. FIG. 9 illustrates that the object moves from a point A to a point B during t seconds and the corresponding object image formed on the image sensor moves from a point C to a point D. Now assume that v[pixel] is a distance between the point C and the point D, f[mm] is a focal length, and p[μm/pixel] is a pixel pitch of the image sensor. Then, an angular velocity ω [rad/sec] of the object on the image plane is expressed by the following expression.

EXPRESSION 1

$$\tan\frac{\omega}{2}[\text{rad/sec}] = \frac{v}{2}[\text{pixel}] \times \frac{p}{1000}[\text{mm/pixel}] \div t[\text{sec}] \div f[\text{mm}] = \frac{vp}{2000tf}$$

$$\omega = 2\tan^{-1}\left(\frac{vp}{2000tf}\right)\ [\text{rad/sec}]$$

In the step S205, the main control unit 152 sends the shift lens driving amount to the lens microcomputer 113, and requests the lens microcomputer 113 to drive the shift lens 104. In addition, the main control unit 152 requests the driver 133 to open the shutter 121 and to close the shutter 121 within a predetermined time period.

Thus, in the imaging in the follow shot assisting mode, the image stabilizing apparatus (follow shot assisting apparatus) moves the image stabilization lens (shift lens) so as to absorb the difference between the object moving velocity and the panning velocity made by the photographer in the follow shot imaging.

In the step S206, the main control unit 152 requests the camera signal processing circuit 124 to develop the development data made by exposure in the image sensor 122 and to record the resultant data in the memory card 171. Then, the process ends.

Object Motion Vector Amount Calculating Process

Figure 3:
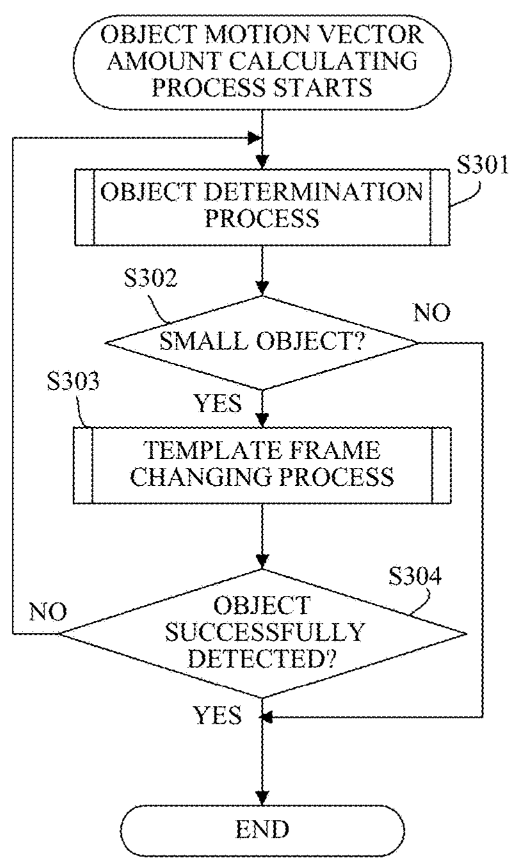
FIG. 3 is a flowchart of an object motion vector amount calculating process according to the first embodiment.

Referring now to a flowchart in FIG. 3, a description will be given of a description of the object motion vector amount calculating process made by the object motion vector amount calculating unit 154. This process starts when the object motion vector amount calculating unit 154 receives the calculation start request from the main control unit 152.

In the step S301, the object motion vector amount calculating unit 154 executes an object determination process, which will be described later.

In the step S302, the object motion vector amount calculating unit 154 determines whether the result of the object determination process indicates a small object. More specifically, the object motion vector amount calculating unit 154 refers to a small object flag, which will be described later, acquired as a result of the object determination process. When the object is the small object, the small object flag is set to TRUE, and when the object is not the small object, the small object flag is set to FALSE. When the object is determined the small object in the step S302, the flow moves to the step S303 so as to change the template frame. When the object is not determined the small object in the step S302, the process ends.

In the step S303, the object motion vector amount calculating unit 154 executes a template frame changing process configured to change the template frame based on the position of the object. A detailed description will be given of the template frame changing process later.

This embodiment ends the process when the object is determined larger than the predetermined size in the step S302 (No in S302), and does not execute the template frame changing process in the step S303. In other words, when the object is determined larger than the predetermined size in the step S302, the template frame is not changed. When the object is determined smaller than the predetermined size in the step S302, the template frame is changed based on the position of the object. The object motion vector amount calculating unit 154 determines the size of the object based on the object motion vector, and changes the template frame based on the size and position of the object.

In the step S304, the object motion vector amount calculating unit 154 determines whether the object has been successfully detected. More specifically, the object motion vector amount calculating unit 154 refers to an object detection success flag, which will be described later, acquired as a result of the template frame changing process. When the object has been successfully detected, the object detection success flag is set to TRUE, and when the detection of the object has failed, the object detection success flag is set to FALSE. When the object has been successfully detected in the step S304, the process ends. When the object has not been successfully detected in the step S304, it is determined that the detection of the object has failed and the flow returns to the step S301 so as to re-detect the object.

Object Determination Process

Next follows a description of the object determination process for determining whether the object is the small object in the object motion vector amount calculating unit 154. This process starts when it is called by the object motion vector amount calculating process.

Figure 12:
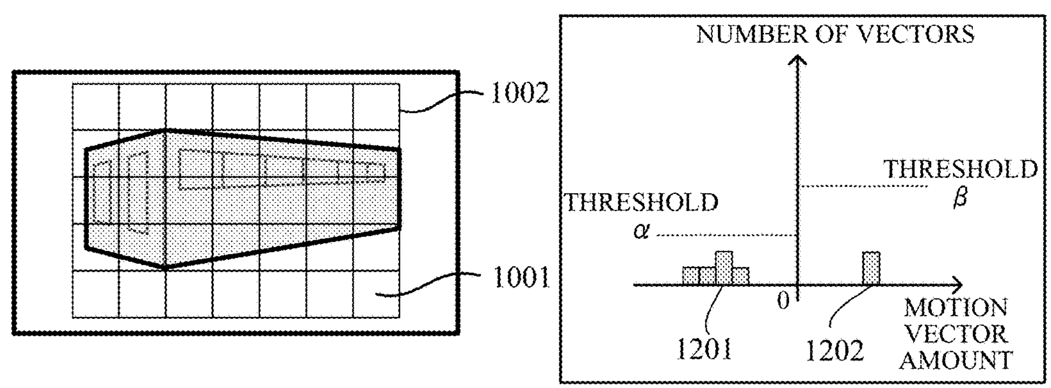
FIG. 12 illustrates a histogram of a low-contrast object.

Referring now to FIGS. 10 and 12, a description will be given of a method for determining whether the object is small.

As illustrated in the reference numerals 1005 and 1006 in FIG. 10, when the object is large, the number of vectors of the object increases. It is determined that the object is not small, when the number of vectors of the object is equal to or larger than a threshold (referred to as a "threshold $\alpha$" hereinafter).

On the other hand, the object is determined small when the number of vectors of the object is smaller than the threshold $\alpha$. Although the object is large, it may be determined small.

For example, assume a low-contrast object as illustrated in FIG. 12. Since the process for detecting the motion vector amount uses block matching, etc., the motion vector amount cannot be detected and the detection fails when the contrast is low, and part of the motion vector amount of the object may not be detected. In that case, although the object is large, as illustrated in 1201 in FIG. 12, the number of vectors of the object becomes smaller than the threshold $\alpha$. Thus, when the number of vectors of the object is determined smaller than the threshold $\alpha$, the object may be determined small although the object is actually large.

Accordingly, as illustrated in 1202 in FIG. 12, the number of vectors of the background is used.

When the object is large, there are a small number of vectors of the background. When the number of vectors of the background is equal to or larger than a predetermined threshold (referred to as a "threshold $\beta$" hereinafter), it can be determined that the object is small. As understood in FIG. 12, when the object has a low contrast and is large, the number of vectors of the background is smaller than the threshold $\beta$. Thus, whether the object is small or not can be more precisely determined by determining the number of the vectors of the background in addition to determining the number of vectors of the object. While it is necessary to determine the motion vector amount of the object and the motion vector amount of the background, the motion vector amount of the background is the same as the motion vector amount of the image pickup apparatus. Thus, the motion vector amount of the background can be determined. More specifically, the motion vector amount of the object can be discriminated from the motion vector amount of the background by acquiring the motion vector amount of the image pickup apparatus from the angular velocity sensor 111 through the lens microcomputer 113 and by comparing it with the motion vector amount in the histogram.

When the object is small, the motion vector amount of the object collectively exits as illustrated in the reference numeral 1007 in FIG. 10. Thus, the vector detecting frame used to detect the motion vector amount of the object (referred to as an "object point" hereinafter) is checked. When a range of the object point (referred to as an "object range" hereinafter) exists in a predetermined range (referred to as a "small object determination range" hereinafter), the object is determined small.

More specifically, a minimum value (X, Y) and a maximum value (X, Y) are calculated from among the center position (X, Y) of the object point, and the size calculated as a "size (X, Y)=the maximum value (X, Y)−the minimum value (X, Y)" is set to the object range. The size of the object range (X, Y) is compared with the size of the predefined small object determination range (X, Y). When it is located in the small object determination range, the object is determined small. In addition to the size (X, Y) as information of the object range, the center position (X, Y) of the object range is stored.

Figure 4:
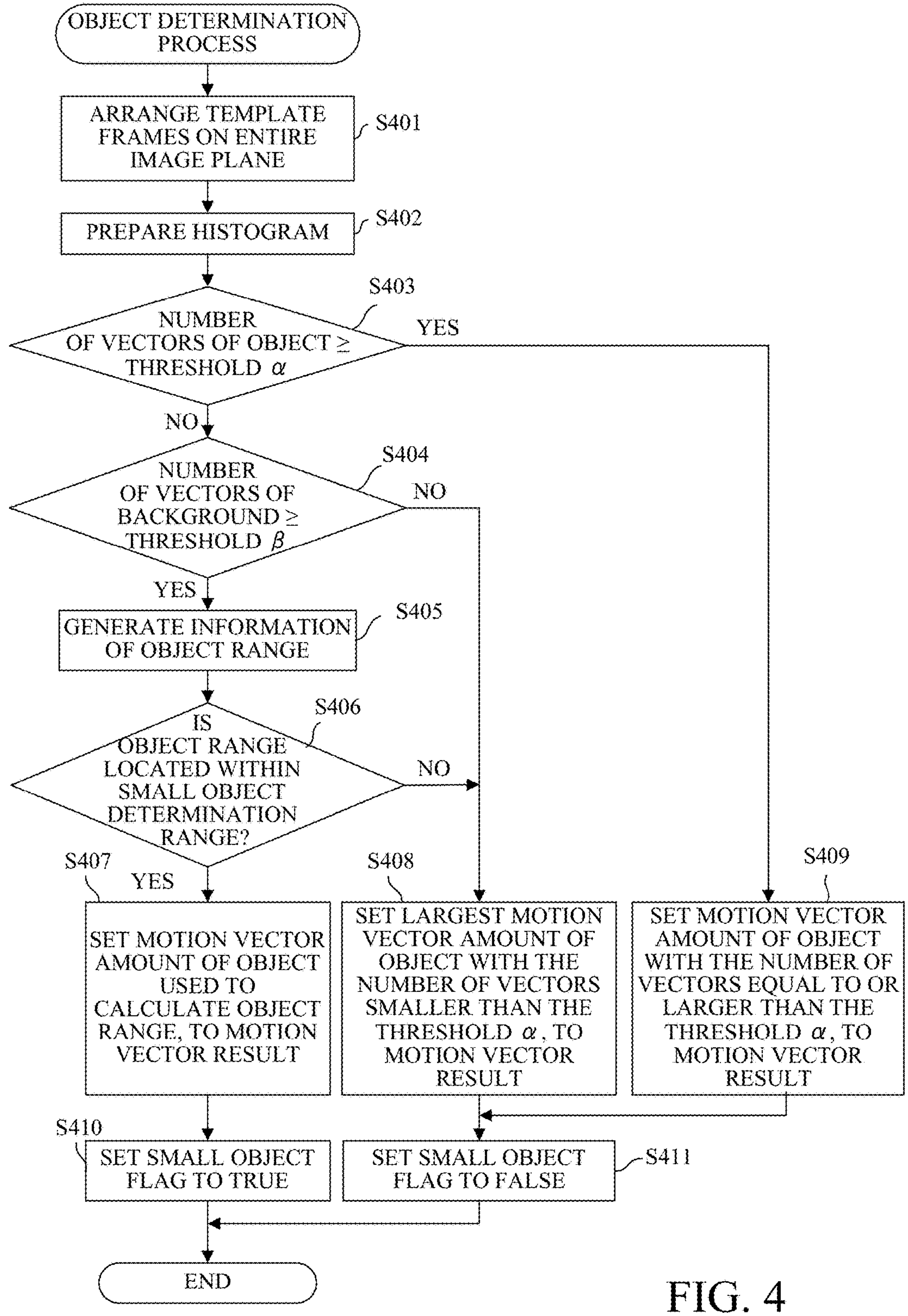
FIG. 4 is a flowchart of an object determination process according to the first embodiment.

Referring now to a flowchart in FIG. 4, a description will be given of the object determination process.

In the step S401, the object motion vector amount calculating unit 154 requests the motion vector detecting unit 141 to change the template frame so as to dispose the template frame on the entire image plane.

Herein, the template frame having the 7×5 vector detecting frame is similarly to FIG. 10.

In the step S402, the object motion vector amount calculating unit 154 acquires the motion vector amount of the vector detecting frames arranged in the template frame from the motion vector detecting unit 141, and prepares a histogram. Herein, as illustrated in FIG. 10, the histogram has the motion vector amount in the abscissa axis, and the number of vectors in the ordinate axis. The motion vector amounts of the object and the background are determined.

In the steps S403, the object motion vector amount calculating unit 154 determines, based on the histogram, whether the number of vectors of the object is equal to or larger than the threshold α. In the step S403, when the number of vectors is determined equal to or larger than the threshold α, the object is determined large and the flow moves to the step S409. In the step S403, when the number of vectors is determined smaller than the threshold α, the flow moves to S404 so as to check the number of vectors of the background since the object is likely small.

In the step S404, the object motion vector amount calculating unit 154 determines, based on the histogram, whether the number of vectors of the background is equal to or larger than the threshold β. In the step S404, when the number of vectors is determined equal to or larger than the threshold R, the flow moves to S405 so as to generate information of the object range since the object is highly likely small. In other words, when the number of areas (vector detecting frames) used to detect motion vector of the object is smaller than the threshold α (first threshold) and the number of areas (vector detecting frames) used to detect the motion vector of the background is larger than the threshold β (second threshold), the object is highly likely small. On the other hand, when the number of vectors is determined smaller than the threshold β in the step S404, the object is determined large and the flow moves to the step S408.

In the step S405, the object vector amount calculating unit 154 generates information of the object range. Herein, the motion vector amount of the object used to check the object point is the largest motion vector amount of the object with the number of vectors smaller than the threshold α.

The information of the object range will be also used for the template frame changing process, which will be described later, and thus stored in the primary storage unit 135.

In the step S406, the object motion vector amount calculating unit 154 determines whether the object range is located within the small object determination range. More specifically, the size (X, Y) of the object range is compared with the size (X, Y) of the predefined small object determination range. When it is determined to be within in the small object determination range in the step S406, the flow moves to the step S407. When it is determined to be outside the small object motion vector amount calculating unit 154 in the step S406, the flow moves to the step S408.

In the step S407, the object motion vector amount calculating unit 154 stores the motion vector result in the primary storage unit 135 when receiving the acquisition request form the main control unit 152. While the template frame changing process, which will be described later, improves the reliability of the motion vector of the object, the motion vector amount of the object settled at present is stored as the motion vector result. The stored motion vector result is the motion vector amount of the object used to check the object point in the step S405.

In the step S410, the object motion vector amount calculating unit 154 determines the small object as the result of the object determination process, and sets the small object flag to TRUE. Then, the flow ends.

The steps S408 and S409 are the steps executed when the object is large, and the motion vector result is stored in the primary storage unit 135 similarly to S407.

In the step S408, the object motion vector amount calculating unit 154 determines that the object is large and has a low contrast, and stores, as the motion vector result, the largest motion vector amount of the object with the number of vectors of the object smaller than the threshold α. Then, the flow moves to the step S411.

In the step S409, the object motion vector amount calculating unit 154 determines that the object is large, and stores, as the motion vector result, the motion vector amount of the object with the number of vectors equal to or larger than the threshold α. Then, the flow moves to S411.

In the step S411, the object motion vector amount calculating unit 154 determines the non-small object as a result of the object determination process, and sets the small object flag to FALSE. Then, the flow ends.

Template Frame Changing Process

Next follows a description of the template frame changing process configured to change the template frame made by the object motion vector amount calculating unit 154. This process starts when it is called by the object motion vector amount calculating process.

Figure 13A:
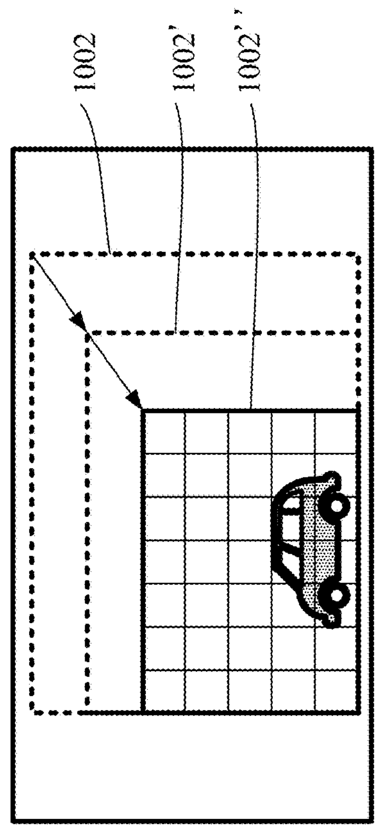
FIGS. 13A and 13B illustrate a method for changing a size of a template frame.
Figure 13B:
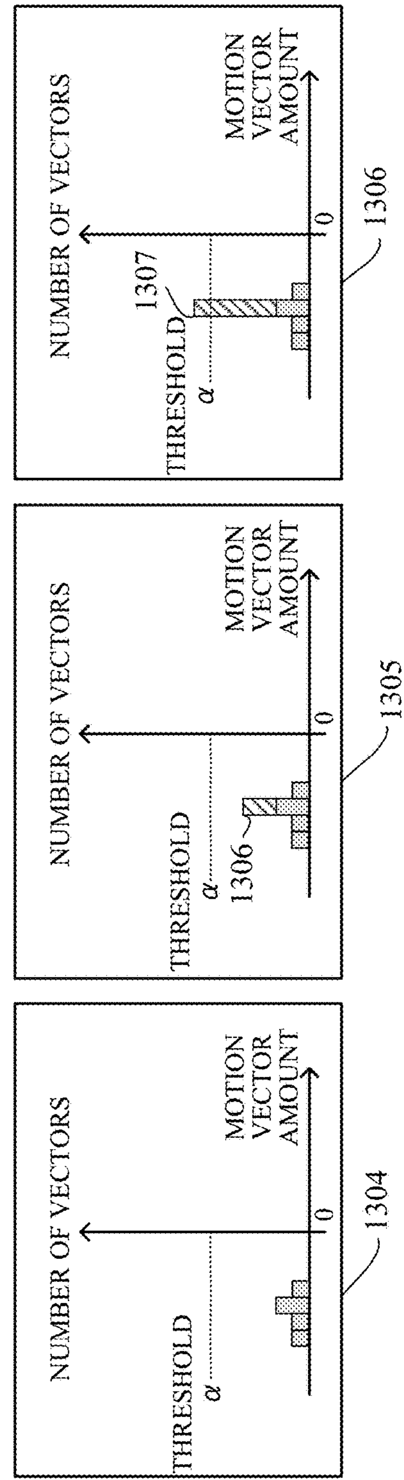

Referring now to FIGS. 13A and 13B, a description will be given of a method for changing the size of the template frame.

FIG. 13A illustrates that the template frame on the image plane is reduced in order of reference numeral 1002, reference numeral 1002' and reference numeral 1002". FIG. 13B illustrates a histogram. Reference numeral 1304 denotes the histogram corresponding to the reference numeral 1002, reference numeral 1305 denotes the histogram corresponding to the reference numeral 1002', and reference numeral 1306 denotes the histogram corresponding to the reference numeral 1002". Each of reference numerals 1306 and 1307 denotes the increased number of vectors of the object.

Thus, as the template frame is reduced, more vectors of the object can be acquired and the reliability of the motion vector of the object improves.

Figure 14:
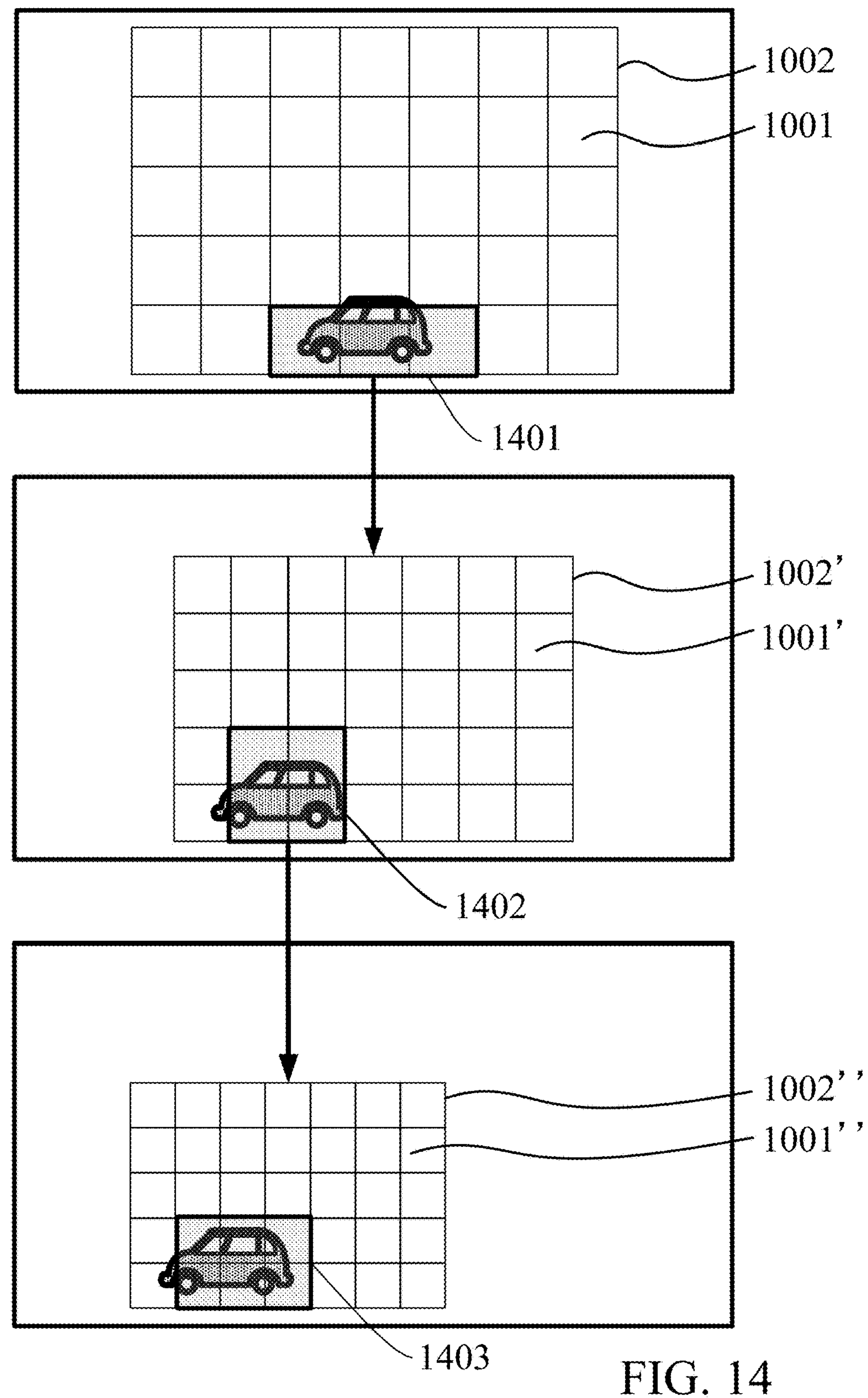
FIG. 14 illustrates a method for changing a position of a template frame.

Referring now to FIG. 14, a detailed description will be given of a method for changing a position of the template frame. FIG. 14 also illustrates gradually reduced templates in order of reference numerals 1002, 1002' and 1002". Reference numerals 1001, 1001', and 1001" denote vector detecting frames corresponding to the template frames 1002, 1002' and 1002", respectively.

As described above, it is conceivable that the photographer pans his camera in accordance with the motion of the object in the follow shot imaging, and the object can be located outside the template frame. Accordingly, as illustrated in reference numerals 1401, 1402, and 1403 in FIG. 14, the center position (X, Y) of the object range is checked based on the information of the object range, and the position of the template frame is changed so that the center of the template frame is located at the center position (X, Y) of the object range. Thereby, the object can be prevented from being located outside the template frame.

Herein, in reducing the template frame, this embodiment reduces the size of the vector detecting frame while maintaining the number of vector detecting frames (7×5 in this embodiment) as illustrated in FIG. 14.

Figure 5:
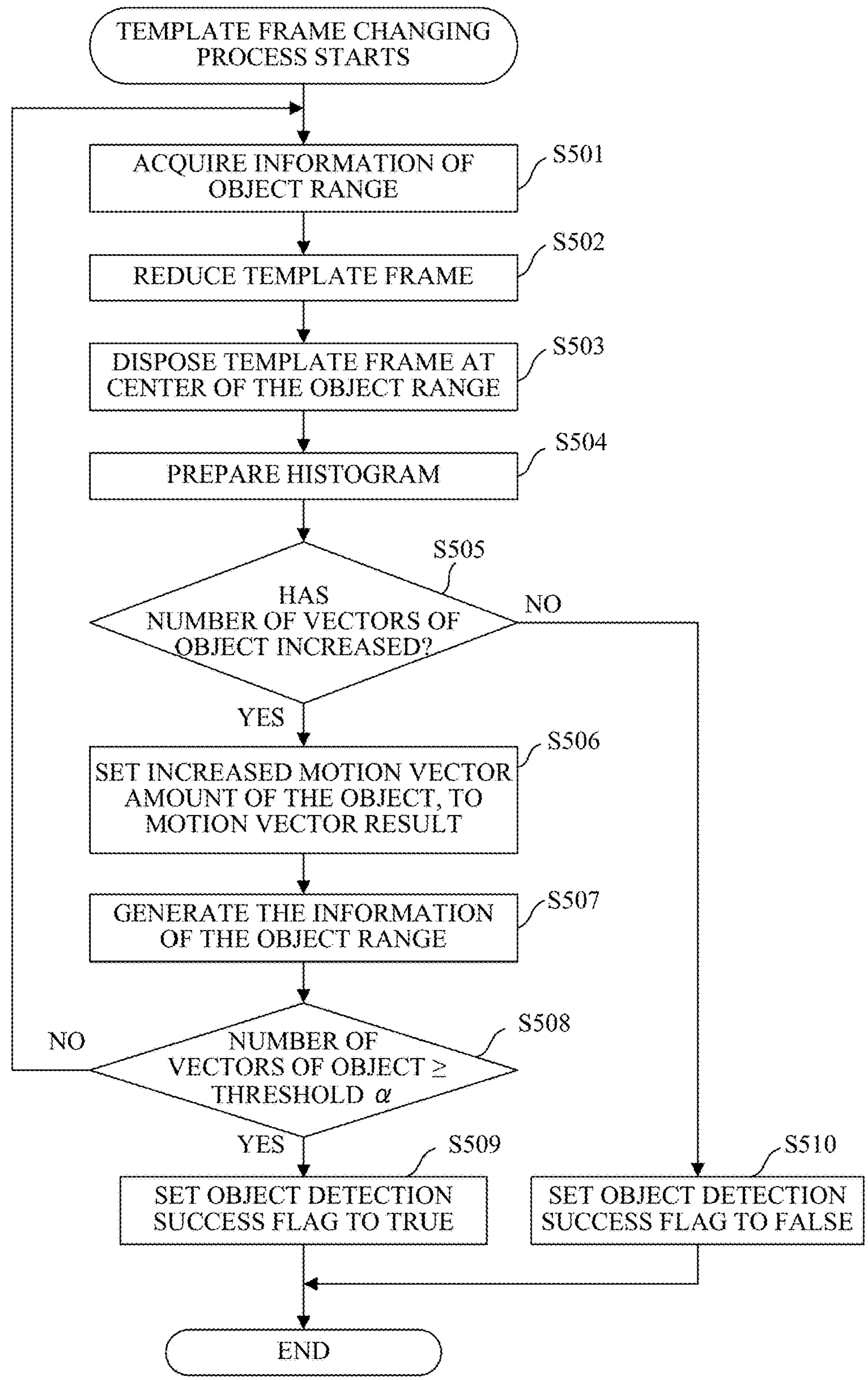
FIG. 5 is a flowchart of a template frame changing process according to the first embodiment.

Referring now to FIG. 5, a description will be given of the template frame changing process.

In the step S501, the object motion vector amount calculating unit 154 acquires the information of the object range stored in the primary storage unit 135.

Figure 15:
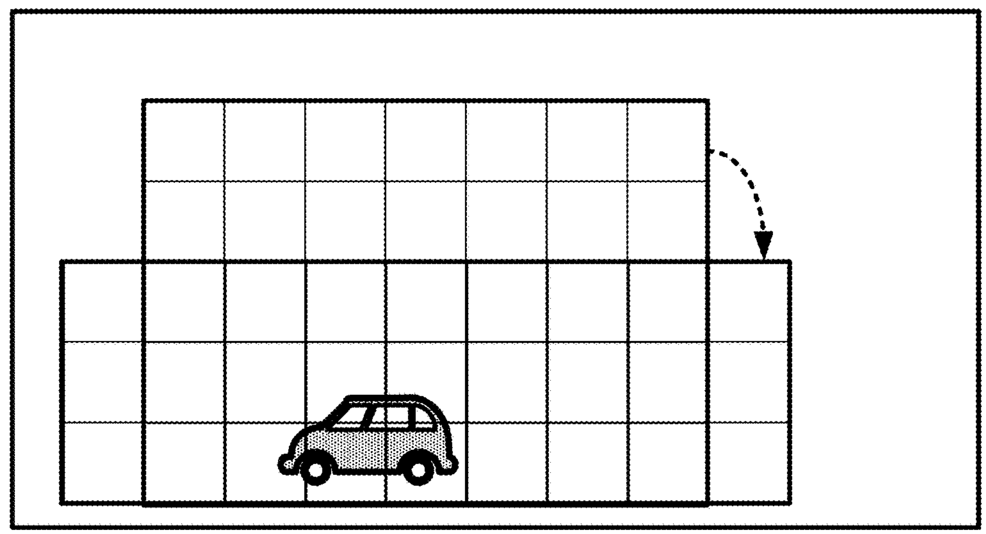
FIG. 15 illustrates a method for arranging template frames.

In the step S502, the object motion vector amount calculating unit 154 requests the motion vector detecting unit 141 to change the size of the template frame so as to reduce the template frame. Herein, assume that the reduction ratio is 1/2, but the reduction ratio is not limited. The reduction ratio of the template frame may be 1/3, 1/4, or another value, or the reduction ratio may provide the size (X, Y) of the object range. In addition, when there is a space for disposing the template frame by changing the reduction ratio as illustrated in FIG. 15, the motion vector of the image pickup apparatus may be acquired from the angular velocity sensor 111 through the lens microcomputer 113 and the shape of the template frame relative to the panning direction may be changed.

In the step S503, the object motion vector amount calculating unit 154 requests the motion vector detecting unit 141 to move the center position (X, Y) of the template frame to the center position (X, Y) of the object range acquired in the step S501. In other words, the object motion vector calculating unit 154 reduces the template frame and changes the center position of the template frame to the center position of the object, when the object is smaller than the predetermined size.

In the step S504, the object motion vector amount calculating unit 154 acquires the motion vector amounts of the vector detecting frames arranged in the template frame from the motion vector detecting unit 141, and prepares the histogram.

In the step S505, the object motion vector amount calculating unit 154 determines whether the number of vectors of the object has increased. More specifically, the object motion vector amount calculating unit 154 changes the size and the center position of the template frame, then determines the motion vectors of the object and the background, and determines whether the number of areas (vector detecting frames) used to detect the motion vector of the object has increased. When it is determined in the step S505 that the number of areas has increased, the flow moves to S506 so as to store the detected motion vector result in the primary storage unit 135. When it is determined in the step S505 that the number of areas has not increased, it is determined that the motion vector amount of the object cannot be determined and the flow moves to the S510.

In the step S506, the object motion vector amount calculating unit 154 stores, as the motion vector result, the motion vector amount to the number of vectors of the object increased in the step S505.

In the step S507, the object motion vector amount calculating unit 154 generates the information of the object range to the motion vector increased as in the step S506, and stores the result in the primary storage unit 135.

In the step S508, the object motion vector amount calculating unit 154 determines, based on the histogram, whether the number of vectors of the object is equal to or larger than the threshold α. In the step S508, when the number of vectors is determined equal to or larger than the threshold α, it is determined that the object is successfully detected and the flow moves to the step S509. In the step S508, when the number of vectors is smaller than the threshold α, the flow moves to the step S501 so as to reduce the template frame. More specifically, the object motion vector amount calculating unit 154 changes the size and center position of the template frame and again determines the motion vectors of the object and the background in the steps S502 and S503 after the flow returns to the step S501. Thereafter, the processes in the steps S501 to S507 are repeated until the number of areas (vector detecting frames) used to detect the motion vector of the object is equal to or larger than the threshold α (first threshold) in the step S508. In other words, until the number of areas (vector detecting frames) used to detect the motion vector of the object is equal to or larger than the threshold α (first threshold), the template frame is reduced and the position of the template frame is brought close to the center position of the object.

In the step S509, the object motion vector amount calculating unit 154 determines, based on the result of the template frame change, that the object has been successfully detected, and sets the object detection success flag to TRUE. Then, the process ends.

In the step S510, the object motion vector amount calculating unit 154 determines, based on the result of the template frame change, that the detection of the object has failed, and sets the object detection success flag to FALSE. Then, the process ends.

Thus, the present invention changes the template frame so that the object can fall within the template frame, acquires more vectors of the object, and improves the reliability of the motion vector of the object and the correction precision of the object blur.

More specifically, when determining that the object is small, this embodiment reduces the template frame stepwise so that its center can accord with the center of the small object, and prevents the object from being located outside the template frame.

This configuration can provide an image pickup apparatus configured to improve the reliability of the motion vector of the object and the correction precision of the object blur in the imaging in the follow shot assisting mode.

The present invention is not limited this embodiment. For example, the motion vector amount of the object on the image plane can be small for a long object distance, and thus the reduction ratio of the template frame may be changed based on the object distance.

This embodiment discusses an example that changes the template frame in accordance with the size and the position of the object when the object is determined small. However, the present invention is not limited. Even when the object is large, the template frame may be changed in accordance with the size and position of the object. For example, when the object is determined large, the reliability of the motion vector can be improved by changing the template frame.

This embodiment discusses the example that changes the template frame in accordance with the size and position of the object in assisting the follow shot imaging, but may change the template frame in accordance with the size and position of the object in the normal image stabilization.

Second Embodiment

A second embodiment discusses an image pickup apparatus that can re-detect an object even when the number of vectors of the object does not increase after the template frame is reduced (or when the object is located outside the template frame). The configuration of the image pickup apparatus according to this embodiment is similar to that of the first embodiment (see FIG. 1), and a description thereof will be omitted.

Referring now to FIG. 11, a description will be given of an object re-detecting method.

As illustrated in FIG. 11, the object may be located outside the template frame. It is conceivable that the moving direction of the object is a ±direction of the panning direction (the panning direction or the direction reverse to the panning direction), since the photographer pans the camera in accordance with the motion of the object in the follow shot imaging. Thus, the object is likely to be re-detected by shifting the template frame in the panning direction. More specifically, the motion vector amount of the image pickup apparatus is acquired from the angular velocity sensor 111 through the lens microcomputer 113 the panning direction (vibration direction) is checked. An increase of the number of vectors of the object is checked while the template frame is shifted in the ±direction of the panning direction (the direction parallel to the vibration direction).

Template Frame Changing Process

Figure 6:
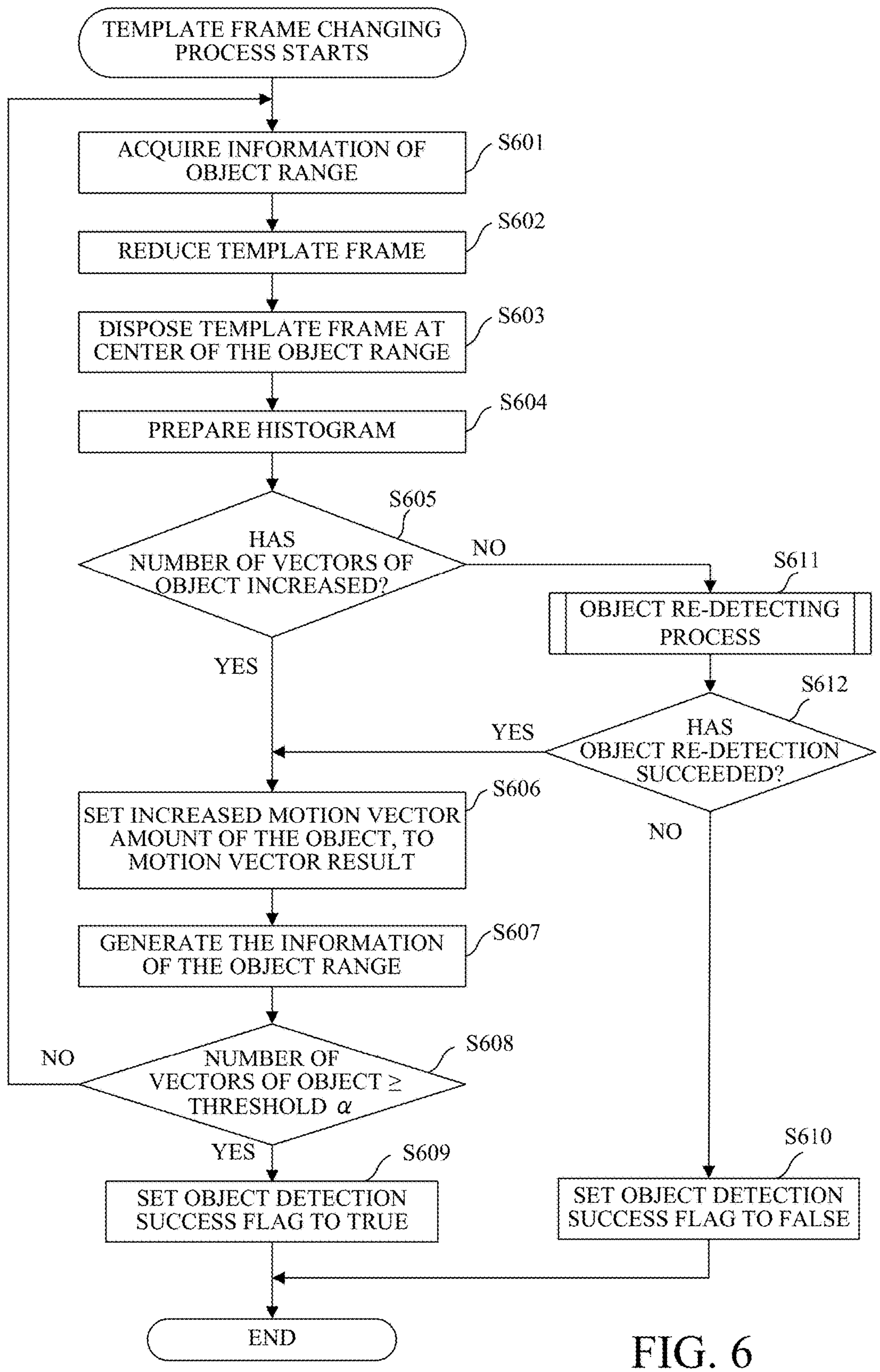
FIG. 6 is a flowchart of a template frame changing process according to a second embodiment.

Referring now to a flowchart in FIG. 6, a description will be given of a template frame changing process made by the object motion vector amount calculating unit 154 according to the second embodiment.

Since the steps S601 to S610 are the same as the steps S501 to S510 in the first embodiment, a description thereof will be omitted.

In the step S611, since the object motion vector amount calculating unit 154 determines that the number of vectors of the object has not increased in the step S605, the object motion vector amount calculating unit 154 executes the object re-detecting process that moves the position of the template frame based on the vibration direction detected by the angular velocity sensor. A detailed description of the object re-detecting process will be given later.

In the step S612, the object motion vector amount calculating unit 154 determines whether the object is successfully re-detected. More specifically, the object motion vector amount calculating unit 154 refers to the object re-detection success flag, which will be described later, acquired as a result of the object re-detecting process. When the object is successfully re-detected, the object re-detection success flag is set to TRUE, and when the re-detection of the object fails, the object re-detection success flag is set to FALSE.

Object Re-Detecting Process

Figure 7:
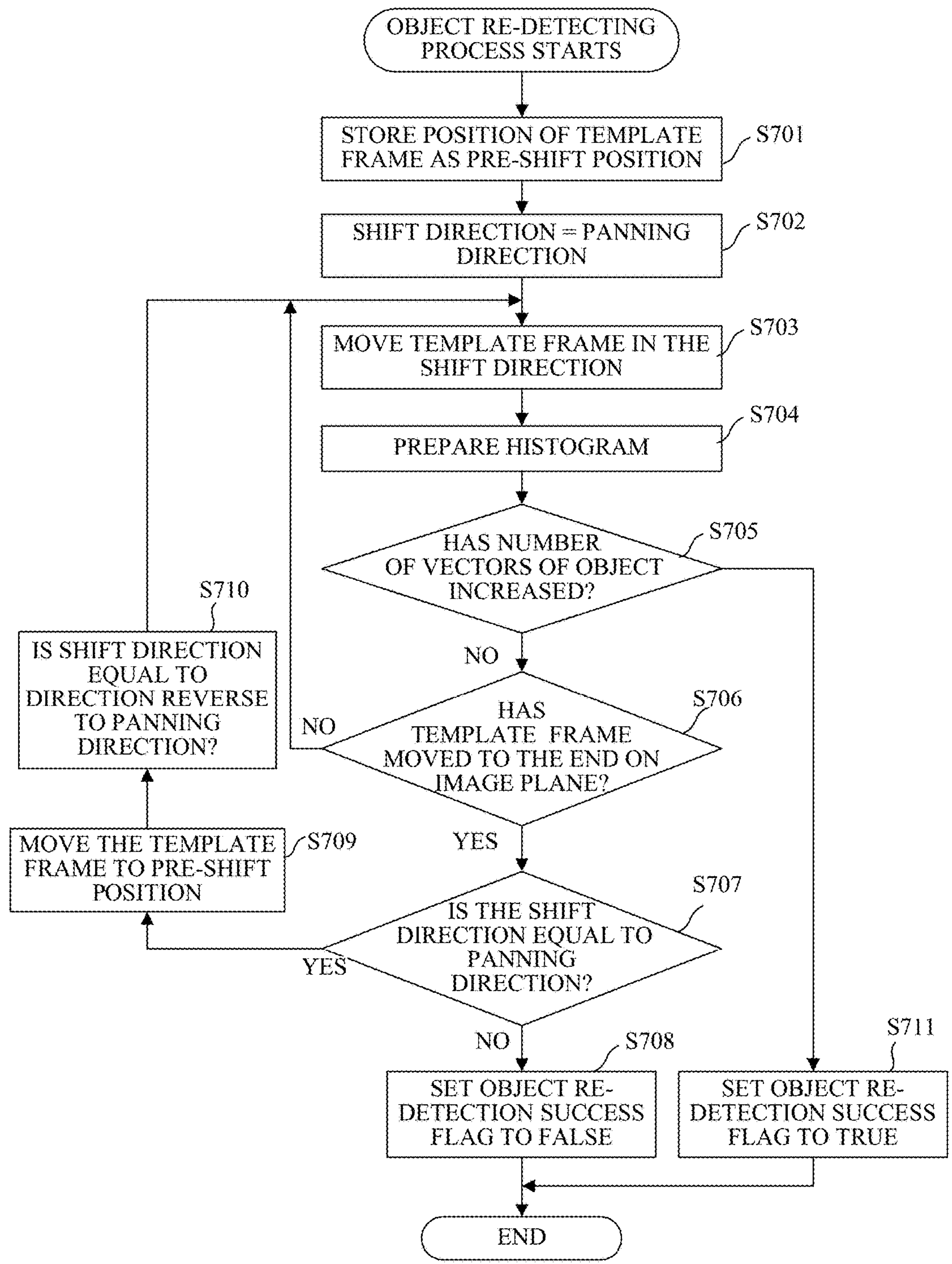
FIG. 7 is a flowchart of an object re-detection process according to the second embodiment.

Referring now to a flowchart in FIG. 7, a description will be given of the object re-detecting process made by the object motion vector amount calculating unit 154.

In the step S701, the object motion vector amount calculating unit 154 stores the position of the template frame as a pre-shift position. Herein, the center position (X, Y) of the template frame is stored.

In the step S702, the object motion vector amount calculating unit 154 acquires the motion vector amount of the image pickup apparatus from the angular velocity sensor 111 through the lens microcomputer 113, checks the panning direction, and determines the shift direction of the template frame. Assume that the photographer pans the camera in the right direction, and the shift direction of the template frame is set to the right direction.

In the step S703, the object motion vector amount calculating unit 154 requests the motion vector detecting unit 141 to move the template frame in the shift direction. More specifically, the object motion vector amount calculating unit 154 moves the center position of the template frame in a direction parallel to the vibration detected by the angular velocity sensor 111. Herein, a moving amount of the template frame is set to 1/2 of the X size of the template frame, but the moving direction is not limited.

In the step S704, the object motion vector amount calculating unit 154 acquires the motion vector amounts of the vector detecting frames arranged in the template frame from the motion vector detecting unit 141, and prepares the histogram.

In the step S705, the motion vector amount calculating unit 154 determines whether the number of vectors of the object has increased. When it is determined in the step S705 that the number of vectors has increased, the object has been successfully re-detected and the flow moves to the step S711. When it is determined in the step S705 that the number of vectors has not increased, it is determined that the re-detection of the object has failed and the flow moves to the step S706.

In the step S706, the object motion vector amount calculating unit 154 determines whether the template frame has moved to the end on the image plane. When it is determined in the step S706 that the template frame has moved to the end of the image plane, the flow moves to the step S707. When it is determined in the step S706 that the template frame has not yet moved to the end of the image plane, the flow moves to the step S703 so as to further shift the template frame.

In the step S707, the object motion vector amount calculating unit 154 determines whether the shift direction is the panning direction. More specifically, this is the process for determining whether the shift process in the ±direction of the template frame has completed. If the shift direction is the panning direction, the shift process in the direction reverse to the panning direction has not yet completed. When the shift direction is determined to be the panning direction in the step S707, it is determined that the process in the reverse direction has not completed and the flow moves to the step S709. When the shift direction is not determined to be the panning direction in the step S707, it is determined that the re-detection of the object has failed and the flow moves to the step S708.

In the step S709, the object motion vector amount calculating unit 154 acquires the pre-shift position stored in the step S701 in order to return the template frame to the original position. In addition, the object motion vector amount calculating unit 154 requests the motion vector detecting unit 141 to move the template frame to the pre-shift position.

In the step S710, the object motion vector amount calculating unit 154 sets the shift direction of the template frame to the direction reverse to the panning direction, and the flow returns to the step S703. Herein, the right direction is originally set to the shift direction, and the left direction is next set to the shift direction.

In the step S708, the object motion vector amount calculating unit 154 sets the object re-detection success flag to FALSE since it is determined that the re-detection of the object has failed. Then, the flow ends.

In the step S711, the object motion vector amount calculating unit 154 sets the object re-detection success flag to TRUE since it is determined that the object has been successfully re-detected. Then, the flow ends.

Similar to the first embodiment, this embodiment can change the template frame so that the object can be located within the template frame, acquires more vectors of the object, and improves the reliability of the motion vector of the object and the correction precision of the object blur.

In addition, this embodiment can provide the image pickup apparatus that can re-detect the object, when the template frame is reduced, by shifting the template frame in the panning direction or in the direction reverse to the panning direction even when the object is located outside the template frame.

Third Embodiment

A third embodiment discusses an image pickup apparatus that can reduce a template frame and a search area and improve the reliability of the motion vector of the object and the correction precision of the object blur.

The configuration of the image pickup apparatus in this embodiment is similar to that of the first embodiment (see FIG. 1), and a description thereof will be omitted.

Initially, the search area will be described in detail with reference to FIGS. 16A and 16B.

Figure 16A:
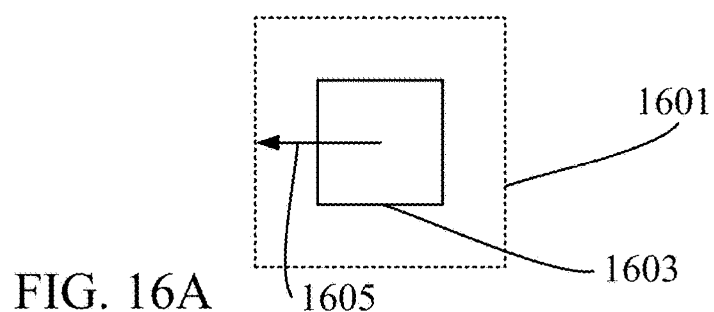
FIGS. 16A and 16B illustrate a relationship between a reduced template frame and a search area.

FIG. 16A illustrates a search area 1601 and a vector detecting frame 1603 before the template frame is reduced.

Figure 16B:
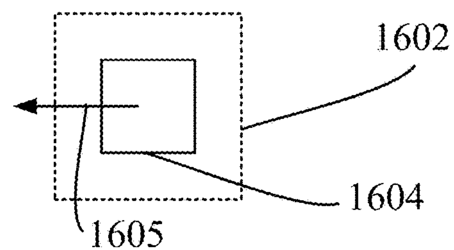

FIG. 16B illustrates a search area 1602 and a vector detecting frame 1604 after the template frame is reduced. Both the template frame and the search area 1602 are reduced.

When the speed of the object and the panning speed of the photographer are constant, the motion vector amount of the object does not change even when the template frame is reduced and thus FIGS. 16A and 16B illustrate the same motion vector amount 1605.

In FIG. 16A, the motion vector amount 1605 is within the search area 1601 and the motion vector is detectable. In FIG. 16B, however, the motion vector amount 1605 is located outside the search area 1602 and the motion vector amount cannot be detected. As a result, an error occurs, and the motion vector amount of the object cannot be acquired.

If the template frame is reduced when the motion vector amount of the object is large in the image pickup apparatus, the motion vector amount of the object cannot be acquired.

Accordingly, this embodiment reduces the vector detecting frame when it is determined that the motion vector amount of the small object is small (when the panning speed is close to the speed of the object).

Object Motion Vector Amount Calculating Process

Figure 8:
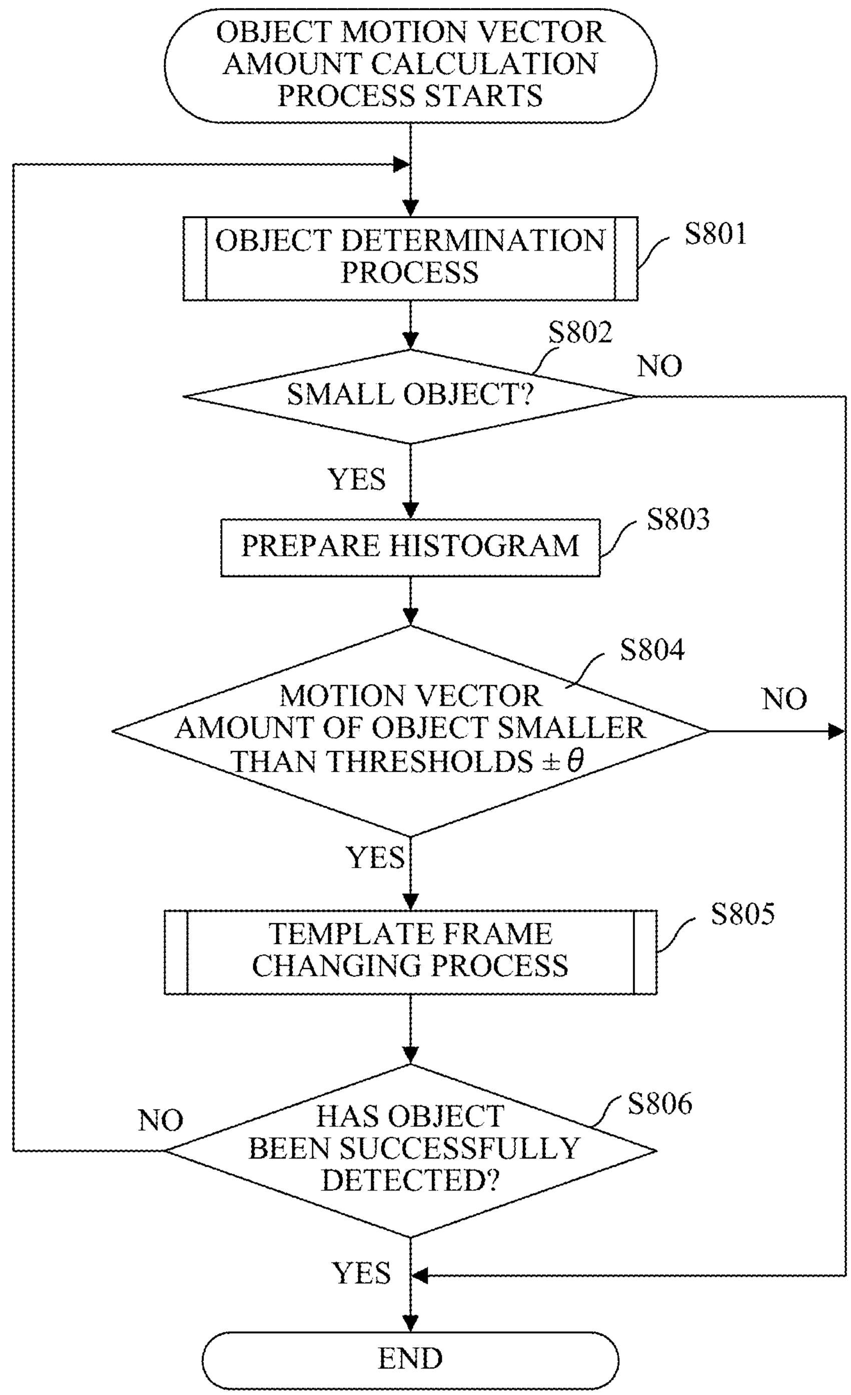
FIG. 8 is an object motion vector amount calculating process according to a third embodiment.

Referring now to a flowchart in FIG. 8, a description will be given of an object motion vector amount calculating process made by the object motion vector amount calculating unit 154 according to a third embodiment.

The steps S801 and S802 are the same as the steps S301 and S302, and thus a description thereof will be omitted. The steps S805 and S806 are the same as the steps S303 and S304 in the first embodiment, and a description thereof will be omitted.

In the step S803, the object motion vector amount calculating unit 154 acquires motion vector amounts of the vector detecting frames arranged in the template frame from the motion vector detecting unit 141, and prepares a histogram.

In the step S804, the object motion vector amount calculating unit 154 determines whether the motion vector amount of the object is smaller than a ±threshold θ. The ±threshold θ is a value when the motion vector amount of the object is around ±0.

In the step S804, when it is determined that the motion vector amount of the object is smaller than ±threshold θ, the flow moves to the step S805 so as to change the template frame. In the step S804, when the motion vector amount of the object is not smaller than ±threshold θ, the process ends since the template frame is not changed. In other words, the object motion vector amount calculating unit 154 determines whether the template frame is to be changed based on the size of the motion vector of the object when determining that the size of the object is smaller than the predetermined size in the step S802. When the motion vector amount of the object is smaller than the ±threshold θ (predetermined value), the object motion vector amount calculating unit 154 determines that the template frame is to be changed. When the motion vector amount of the object is larger than the ±threshold θ (predetermined value), the object motion vector amount calculating unit 154 determines that the template frame is not to be changed.

Similar to the first embodiment, this embodiment changes the template frame so that the object can be located within the template frame, acquires more vectors of the object, and improves the reliability of the motion vector of the object and the correction precision of the object blur.

In addition, this embodiment improves the reliability of the motion vector of the object by reducing the template frame based on the motion vector amount of the object.

Thereby, the image pickup apparatus that reduces the template frame and the search area can improve the correction precision of the object blur in the imaging in the follow shot assisting mode.

The present invention is not limited to this embodiment, and may prepare a histogram of past several frames and determine whether the average value of the motion vector amount of the object is smaller than the ±threshold θ.

Since the motion vector amount of the object is small, the reduction ratio of the template frame changing process may not be stepwise set to 1/2 etc. and may be set to the size (X, Y) of the object range.

The present invention can provide an image stabilizing apparatus, its control method, an image pickup apparatus, and a storage medium, which is advantageous to the image stabilization of the object even when the object is smaller than the predetermined size.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to an image pickup apparatus, such as a compact digital camera, a single-lens reflex camera, and a video camera.

This application claims the benefit of Japanese Patent Application No. 2016-043368, filed Mar. 7, 2016, which is hereby incorporated by reference herein in its entirety.

What is claimed is:

1. An image stabilizing apparatus comprising:

one or more processors; and a memory storing instructions which, when executed by the one or snore processors, cause the image stabilizing apparatus to function as:

a detecting unit configured to detect a motion vector in each of a plurality of areas made by dividing a motion vector detecting frame set in each of a plurality of images sequentially output from an imaging unit; and a control unit configured to determine a motion vector of an object in the detected motion vector and to perform an image stabilization control based on the motion vector of the object, wherein the control unit determines a size of the object based on the motion vector of the object, wherein the control unit does not change the motion vector detecting frame when determining that the object is larger than a predetermined size, and wherein the control unit changes the motion vector detecting frame when determining that the object is smaller than the predetermined size.

2. The image stabilizing apparatus according to claim 1, wherein the control unit determines the motion vector of the object and a motion vector of a background in the detected motion vector, and wherein the control unit determines that the object is smaller than the predetermined size, reduces the motion vector detecting frame, and brings a center position of the motion vector detecting frame close to a center position of the object, when the number of areas used to detect the motion vector of the object is smaller than a first threshold and the number of areas used to detect the motion vector of the background is larger than a second threshold.

3. The image stabilizing apparatus according to claim 2, wherein after the control unit changes a size of the motion vector detecting frame and the center position of the motion vector detecting frame, the control unit determines the motion vectors of the object and the background, and reduces the motion vector detecting frame and brings the center position of the motion vector detecting frame close to the center position of the object until the number of areas used to detect the motion vector of the object is larger than the first threshold.

4. The image stabilizing apparatus according to claim 2, wherein the control unit reduces the area so as to maintain the number of areas in reducing the motion vector detecting frame.

5. The image stabilizing apparatus according to claim 2, wherein the memory stores instructions which, when executed by the one or more processors, cause the image processing apparatus to function as an acquiring unit configured to acquire a signal output from a vibration detecting unit configured to detect a vibration, and wherein after the control unit changes a size of the motion vector detecting frame and the center position of the motion vector detecting frame, the control unit determines the motion vectors of the object and the background, and moves the center position of the motion vector detecting frame based on a direction of the vibration detected by the vibration detecting unit when determining that the number of areas has not increased.

6. The image stabilizing apparatus according to claim 5, wherein the control unit moves the center position of the motion vector detecting frame in a direction parallel to the vibration detected by the vibration detecting unit.

7. The image stabilizing apparatus according to claim 1, wherein the control unit determines, based on the size of the motion vector of the object, whether the motion vector frame is to be changed, when determining that the object is smaller than a predetermined size.

8. The image stabilizing apparatus according to claim 7, wherein the control unit changes the motion vector frame when the motion vector of the object is smaller than the predetermined size.

9. An image pickup apparatus comprising:

an imaging unit; and an image stabilizing apparatus that includes:

one or more processors; and a memory storing instructions which, when executed by one or swore cause processors, cause the image stabilizing apparatus to function as:

a detecting unit configured to detect a motion vector in each of a plurality of areas made by dividing a motion vector detecting frame set in each of a plurality of images sequentially output from an imaging unit; and a control unit configured to determine a motion vector of an object in the detected motion vector and to perform an image stabilization control based on the motion vector of the object, wherein the control unit determines a size of the object based on the motion vector of the object, wherein the control unit does not change the motion vector detecting frame when determining that the object is larger than a predetermined size, and wherein the control unit changes the motion vector detecting frame when determining that the object is smaller than the predetermined size.

10. A control method for an image stabilizing apparatus, comprising:

a detecting step configured to detect a motion vector in each of a plurality of areas made by dividing a motion vector detecting frame set in each of a plurality of images sequentially output from an imaging unit; and a control step configured to determine a motion vector of an object in the detected motion vector and to perform an image stabilization control based on the motion vector of the object, wherein the control step determines a size of the object based on the motion vector of the object, wherein the control step does not change the motion vector detecting frame when determining that the object is larger than a predetermined size, and wherein the control step changes the motion vector detecting frame when determining that the object is smaller than the predetermined size.

11. A non-transitory computer-readable storage medium configured to store a program that enables a computer to execute a method that includes the steps of:

a detecting step configured to detect a motion vector in each of a plurality of areas made by dividing a motion vector detecting frame set in each of a plurality of images sequentially output from an imaging unit; and a control step configured to determine a motion vector of an object in the detected motion vector and to perform an image stabilization control based on the motion vector of the object, wherein the control step determines a size of the object based on the motion vector of the object, wherein the control step does not change the motion vector detecting frame when determining that the object is larger than a predetermined size, and wherein the control step changes the motion vector detecting frame when determining that the object is smaller than the predetermined size.

* * * * *